United States Patent
Zhang et al.

(10) Patent No.: US 12,267,486 B2
(45) Date of Patent: Apr. 1, 2025

(54) VIDEO IMAGE CODING METHOD AND SYSTEM, DEVICE AND MEDIUM

(71) Applicant: SUZHOU METABRAIN INTELLIGENT TECHNOLOGY CO., LTD., Jiangsu (CN)

(72) Inventors: Yongxing Zhang, Jiangsu (CN); Xingyuan Li, Jiangsu (CN); Zhen Qin, Jiangsu (CN); Jingjing Chen, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/574,676

(22) PCT Filed: Jan. 28, 2022

(86) PCT No.: PCT/CN2022/074615
§ 371 (c)(1),
(2) Date: Dec. 27, 2023

(87) PCT Pub. No.: WO2023/040166
PCT Pub. Date: Mar. 23, 2023

(65) Prior Publication Data
US 2024/0275946 A1    Aug. 15, 2024

(30) Foreign Application Priority Data
Sep. 17, 2021   (CN) .......................... 202111095002.X (51) Int. Cl.
*H04N 19/105*    (2014.01)
*H04N 19/119*    (2014.01)
*H04N 19/176*    (2014.01)

(52) U.S. Cl.
CPC ......... *H04N 19/105* (2014.11); *H04N 19/119* (2014.11); *H04N 19/176* (2014.11)

(58) Field of Classification Search
CPC .................................................. H04N 19/105
See application file for complete search history.

(56) References Cited

U.S. PATENT DOCUMENTS

2013/0272412 A1   10/2013   Seregin
2024/0223756 A1*   7/2024   Zhang .................. H04N 19/176

FOREIGN PATENT DOCUMENTS

CN    105426413 A    3/2016
CN    106105197 A    11/2016
(Continued)

OTHER PUBLICATIONS

Chinese Office Action received for CN Application No. 202111095002.X on Oct. 29, 2021, 9 pgs.
(Continued)

*Primary Examiner* — Jerry T Jean Baptiste
(74) *Attorney, Agent, or Firm* — Merchant & Gould P.C.

(57) ABSTRACT

Disclosed in the present disclosure is a video image coding method. The method includes: dividing an image frame to be coded into a plurality of sub-blocks, and assigning coordinates to each sub-block; calculating a hash value corresponding to an i-th sub-block according to a content of the i-th sub-block; performing a search in a first hash table by using the hash value corresponding to the i-th sub-block; in response to the coordinates of the first reference block being valid, acquiring a content of the first reference block according to the coordinates of the first reference block, and comparing the content of the first reference block with the content of the i-th sub-block; and in response to the content
(Continued)

of the first reference block being consistent with the content of the i-th sub-block, performing Intra Block Copy (IBC) coding on the i-th sub-block.

19 Claims, 3 Drawing Sheets

(56) References Cited

FOREIGN PATENT DOCUMENTS

| | | |
|---|---|---|
| CN | 109743570 A | 5/2019 |
| CN | 111836046 A | 10/2020 |
| CN | 113542769 A | 10/2021 |

OTHER PUBLICATIONS

Chinese Search Report received for CN Application No. 202111095002.X on Oct. 25, 2021, 2 pgs.
International Search Report and Written Opinion received for PCT Serial No. PCT/CN2022/074615 on Jun. 10, 2022, 9 pgs.

* cited by examiner

VIDEO IMAGE CODING METHOD AND SYSTEM, DEVICE AND MEDIUM

CROSS-REFERENCE TO RELATED APPLICATION

The present application is a National Stage Application of PCT International Application No.: PCT/CN2022/074615 filed on Jan. 28, 2022, which claims priority to Chinese Patent Application 202111095002.X, filed in the China National Intellectual Property Administration on Sep. 17, 2021, the disclosure of which is incorporated herein by reference in its entirety.

TECHNICAL FIELD

The present disclosure relates to the technical field of image coding, and in particular to a video image coding method and system, a device and a storage medium.

BACKGROUND

Two prediction coding methods, intra prediction and inter prediction, can be used in traditional video coding and decoding standards. Intra prediction can reduce the spatial redundancy information of a single frame of image, and inter prediction can reduce the temporal redundancy information between frames.

A new intra prediction technology, Intra Block Copy (IBC), is commonly used for coding data blocks with the same content within a frame.

Most of the current mainstream IBC search algorithms are similar to an inter block search method, for example, a search algorithm based on block matching.

The traditional search algorithm based on block matching aims to search for a reference block that is most similar to the current block. In a natural capture video sequence, due to the influence of factors such as illumination, noise and cameras, pixel values of the same object in two pictures are not identical.

However, the characteristics of a screen content video and the natural capture video sequence are not exactly the same, that is, the screen content is completely generated by an algorithm, so that the pixel value of the video (image) is not affected by the factors such as illumination, noise and cameras. For two identical content blocks, the pixels thereof are also completely consistent and identical. Therefore, the IBC search algorithm should also search for the identical blocks, but the search algorithm based on block matching essentially searches for the similar blocks, so that the search algorithm based on block matching is not the ideal IBC search algorithm.

SUMMARY

In view of this, in order to overcome at least one aspect of the above problems, the present disclosure provides a video image coding method, which includes the following steps.

An image frame to be coded is divided into a plurality of sub-blocks, and coordinates are assigned to each sub-block.

A hash value corresponding to an i-th sub-block is calculated according to a content of the i-th sub-block.

A search is performed in a first hash table by using the hash value corresponding to the i-th sub-block, so as to obtain coordinates corresponding to a first reference block, wherein a hash value corresponding to the first reference block is the same as the hash value corresponding to the i-th sub-block.

According to coordinates of the i-th sub-block, it is determined whether the coordinates of the first reference block are valid.

In response to the coordinates of the first reference block being valid, a content of the first reference block is acquired according to the coordinates of the first reference block, and the content of the first reference block is compared with the content of the i-th sub-block.

In response to the content of the first reference block being consistent with the content of the i-th sub-block, IBC coding is performed on the i-th sub-block.

In some embodiments, the operation that the search is performed in the first hash table by using the hash value corresponding to the i-th sub-block, so as to obtain coordinates corresponding to the first reference block, wherein a hash value corresponding to the first reference block is the same as the hash value corresponding to the i-th sub-block further includes the following operations.

In response to the coordinates of the first reference block not existing in the first hash table, wherein the hash value corresponding to the first reference block is the same as the hash value corresponding to the i-th sub-block, the first hash table is updated to add the hash value corresponding to the i-th sub-block and the corresponding coordinates.

Coding is performed on the i-th sub-block by using a preset coding method.

In some embodiments, the method further includes the following operation.

In response to the coordinates of the first reference block being invalid, coding is performed on the i-th sub-block by using the preset coding method.

In some embodiments, the method further includes the following operations.

In response to the content of the first reference block being inconsistent with the content of the i-th sub-block, a search is performed in a second hash table according to the coordinates of the first reference block, so as to obtain a difference between the coordinates of a second reference block and the coordinates of the first reference block, wherein a hash value corresponding to the second reference block is the same as the hash value corresponding to the first reference block.

The coordinates of the second reference block are determined according to the coordinates of the first reference block and the difference between the coordinates of the second reference block and the coordinates of the first reference block.

A content of the second reference block is acquired according to the coordinates of the second reference block, and the content of the second reference block is compared with the content of the i-th sub-block.

In response to the content of the second reference block being consistent with the content of the i-th sub-block, IBC coding is performed on the i-th sub-block.

In some embodiments, the method further includes the following operation.

The coordinates corresponding to the first reference block in the first hash table are replaced with the coordinates corresponding to the i-th sub-block.

In some embodiments, the method further includes the following operations.

A coordinate difference between the coordinates of the first reference block and the coordinates of the i-th sub-block is calculated.

The second hash table is updated to add the coordinate difference and the coordinates of the i-th sub-block.

In some embodiments, the method further includes the following operation.

A third hash table is updated to add the coordinates and the hash value of the i-th sub-block.

Based on the same concept of the present disclosure, according to another aspect of the present disclosure, the embodiments of the present disclosure further provide a video image coding system. The system includes a dividing module, a calculation module, a search module, a determination module, a comparison module and a coding module.

The dividing module is configured to divide an image frame to be coded into a plurality of sub-blocks, and assign coordinates to each sub-block.

The calculation module is configured to calculate a hash value corresponding to an i-th sub-block according to a content of the i-th sub-block.

The search module is configured to perform a search in a first hash table by using the hash value corresponding to the i-th sub-block, so as to obtain coordinates corresponding to a first reference block, wherein a hash value corresponding to the first reference block is the same as the hash value corresponding to the i-th sub-block.

The determination module is configured to determine whether the coordinates of the first reference block are valid according to coordinates of the i-th sub-block.

The comparison module is configured to acquire a content of the first reference block according to the coordinates of the first reference block, and compare the content of the first reference block with the content of the i-th sub-block in response to the coordinates of the first reference block being valid.

The coding module is configured to perform IBC coding on the i-th sub-block in response to the content of the first reference block being consistent with the content of the i-th sub-block.

In some embodiments, the system further includes the following operations.

The coordinates corresponding to the first reference block in the first hash table are replaced with the coordinates corresponding to the i-th sub-block.

A coordinate difference between the coordinates of the first reference block and the coordinates of the i-th sub-block is calculated.

The second hash table is updated to add the coordinate difference and the coordinates of the i-th sub-block.

Based on the same concept of the present disclosure, according to another aspect of the present disclosure, the embodiments of the present disclosure further provide a computer device, including at least one processor and a memory.

The memory is configured to store a computer program, the computer program can be run on the processor, wherein when the computer program is executed by the processor, the processor performs steps of any of the above video image coding methods.

Based on the same concept of the present disclosure, according to another aspect of the present disclosure, the embodiments of the present disclosure further provide a computer-readable storage medium. The computer-readable storage medium is configured to store a computer program, wherein when the computer program is executed by a processor, the processor performs steps of any of the above video image coding methods.

The present disclosure has the following beneficial technical effects: the video image coding method provided in the present disclosure performs an intra search based on the first hash table. Compared the intra search based on the first hash table with an inter frame block matching search method, it can quickly determine whether a block to be coded can be configured for IBC mode coding.

BRIEF DESCRIPTION OF THE DRAWINGS

In order to illustrate the embodiments of the present disclosure or methods in the conventional art more clearly, the drawings that need to be used in the description of the embodiments or the conventional art will be briefly described below. It is apparent that the drawings in the following description are only some embodiments of the present disclosure, and other drawings can be obtained by those skilled in the art according to these drawings without any creative work.

DETAILED DESCRIPTION OF THE EMBODIMENTS

In order to make the purposes, methods and advantages of the present disclosure clearer, the embodiments of the present disclosure will be further described below in detail with reference to embodiments and the drawings.

It is to be noted that, all expressions "first" and "second" used in the embodiments of the present disclosure are for the purpose of distinguishing two non-identical entities with the same name or non-identical parameters. It is to be seen that "first" and "second" are only for the convenience of expression, and should not be construed as the limitation of the embodiments of the present disclosure, which are not described one by one thereto in the subsequent embodiments.

The latest video coding and decoding protocols such as AV1 and H266 support IBC coding. For coders, an IBC algorithm focuses on searching for duplicate content blocks. The video s coding and decoding protocols do not need to specify an IBC search algorithm. Most of the current mainstream IBC search algorithms are similar to an inter block search method, for example, a search algorithm based on block matching.

The basic idea of the block matching algorithm is to first divide a video image frame into sub-blocks that do not overlap each other and are independent of each other, and it is assumed that all pixel displacements are the same in a sub-block. That is, each sub-block is regarded as a moving object. In a video image frame sequence, a moment t corresponds to a k-th frame of image, and a moment t-x corresponds to a previous k−1 frame of image. For any sub-block in the k frames, a sub-block is searched in the k−1 frame, wherein the sub-block has the highest similarity to a sub-block in the k frames, that is, this process is called block matching.

The criterion for evaluating the similarity of the two sub-blocks is called a matching criterion. Two common matching criteria are as follows.

(1) Minimum Mean Square Error (MSE) Criterion $$MSE(i, j) = \frac{1}{MN}\sum_{x=1}^{M}\sum_{y=1}^{N}[p(x, y) - p_{ref}(x + i, y + j)]^2$$

(2) Minimum Mean Absolute Deviation (MAD) Criterion $$MAD(i, j) = \frac{1}{MN}\sum_{x=1}^{M}\sum_{y=1}^{N}|p(x, y) - p_{ref}(x + i, y + j)|$$

According to the above formula content, both the minimum MSE criterion and the minimum MAD criterion evaluate the similarity by comparing a difference between the contents of the two sub-blocks. That is, the traditional search algorithm based on block matching aims to search for a reference block that is most similar to the current block. In a natural capture video sequence, due to the influence of factors such as illumination, noise and cameras, pixel values of the same object in two pictures are not identical. In this case, the minimum MSE or the minimum MAD can search for the more similar blocks in the traditional natural video sequence.

However, the characteristics of a screen content video and the natural capture video sequence are not exactly the same, that is, the screen content is completely generated by an algorithm, so that the pixel value of the video (image) is not affected by the factors such as illumination, noise and cameras. For two identical content blocks, the pixels thereof are also completely consistent and identical. Therefore, the IBC search algorithm should also search for the identical blocks, but the search algorithm based on block matching essentially searches for the similar blocks, so that the search algorithm based on block matching is not the ideal IBC search algorithm.

In the embodiments of the present disclosure, IBC refers to intra block copy, which is a video coding and decoding manner. Block Vector (BV) refers to a block vector, which describes a position relationship between the IBC and the reference.

Figure 1:
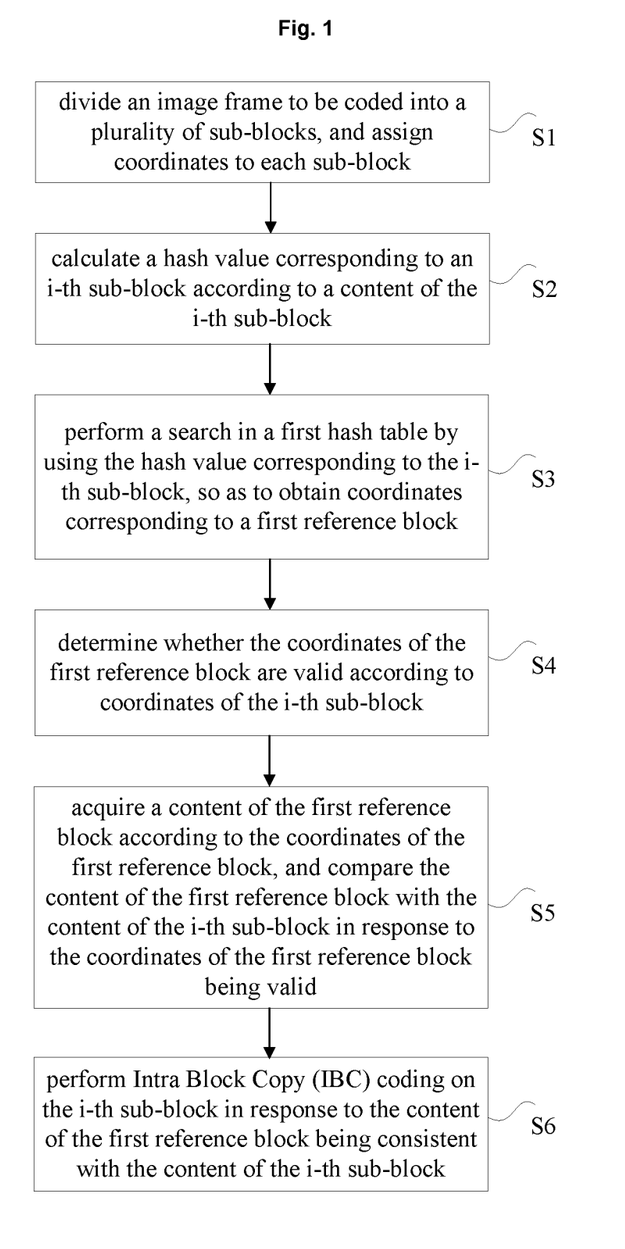
FIG. 1 is a schematic flowchart of a video image coding method provided according to an embodiment of the present disclosure.

According to an embodiment of the present disclosure, the embodiment of the present disclosure provide a video image coding method, as shown in FIG. 1, the method includes the following steps.

At step S1, an image frame to be coded is divided into a plurality of sub-blocks, and coordinates are assigned to each sub-block.

At step S2, a hash value corresponding to an i-th sub-block is calculated according to a content of the i-th sub-block.

At step S3, a search is performed in a first hash table by using the hash value corresponding to the i-th sub-block, so as to obtain coordinates corresponding to a first reference block, wherein a hash value corresponding to the first reference block is the same as the hash value corresponding to the i-th sub-block.

At step S4, according to coordinates of the i-th sub-block, it is determined whether the coordinates of the first reference block are valid.

At step S5, in response to the coordinates of the first reference block being valid, a content of the first reference block is acquired according to the coordinates of the first reference block, and the content of the first reference block is compared with the content of the i-th sub-block.

At step S6, in response to the content of the first reference block being consistent with the content of the i-th sub-block, IBC coding is performed on the i-th sub-block.

The video image coding method provided in the present disclosure performs an intra search based on the first hash table. Compared the intra search based on the first hash table with an inter frame block matching search method, it can quickly determine whether a block to be coded can be configured for IBC mode coding.

In some embodiments, in step S1, the image frame to be coded is divided into the plurality of image sub-blocks, and the coordinates are assigned for each image sub-block. In an embodiment, the image frame to be coded is a video image frame, the video image frame may be divided into M*N sub-blocks that do not overlap each other before coding. Data corresponding to each sub-block may be Pixel[i:i+8, j:j+8], that is, a pixel value of each sub-block is 8*8. The coordinates may be assigned to each sub-block according to the position of each sub-block, for example, the coordinates of a sub-block in the first row and third column may be (1, 3).

In some embodiments, in step S3, the search is performed in the first hash table by using the hash value corresponding to the i-th sub-block, so as to obtain the coordinates corresponding to the first reference block, wherein a hash value corresponding to the first reference block is the same as the hash value corresponding to the i-th sub-block. In an embodiment, the first hash table (Hash table) may be a one-dimensional array, the numeric coordinates correspond to the hash value, and array elements are configured to save the coordinates of the image sub-block, that is, the one-dimensional array uses the hash value as an index and the coordinates of the image sub-block as values. For example, Hash_table[i] save the coordinates $(x_0, y_0)$ of a sub-block with the hash value equal to i, that is, the coordinates $(x_0, y_0)$ of the sub-block may be searched in the first hash table through the hash value i.

It is to be noted that every time coding is performed on a new image frame to be coded, the first hash table needs to be updated to empty. When coding is performed on the current image frame to be coded, the hash values and the coordinates of the sub-blocks divided by the current image frame to be coded are recorded in the first hash table. The hash value has the corresponding coordinates, and the coordinates of the hash value are the coordinates of the latest and nearest sub-block, for example, the coordinates of the hash value i of the current first hash table are $(x_0, y_0)$, when coding is subsequently performed on other sub-blocks, the hash value of the other sub-blocks is also i, and coordinates $(x_0, y_0)$ in the first hash table are replaced with the coordinates $(x_1, y_1)$ of the other sub-blocks.

When the search is performed in the first hash table by using the hash value corresponding to the i-th sub-block, and the coordinates corresponding to the hash value have been recorded in the current first hash table, it indicates that a previous sub-block has the same hash value as that of the i-th sub-block, so that the coordinates corresponding to the first reference block may be obtained through the first hash table, wherein the hash value corresponding to the first reference block is the same as the hash value corresponding to the i-th sub-block.

In some embodiments, in step S4, it is determined whether the coordinates of the first reference block are valid according to the coordinates of the i-th sub-block. In an embodiment, when the coordinates corresponding to the first reference block are obtained through the first hash table, it may be determined whether the coordinates are valid. For example, it is determined whether a coordinate difference is within a preset range, wherein the coordinate difference is the difference between the horizontal and vertical coordinates of the first reference block and the horizontal and vertical coordinates of the i-th sub-block. When the coordinate difference is within the preset range, it indicates that the first reference block is valid, and when the coordinate difference is not within the preset range, it indicates that the first reference block is invalid.

In some embodiments, in step S5, in response to the coordinates of the first reference block being valid, the content of the first reference block is acquired according to the coordinates of the first reference block, and the content of the first reference block is compared with the content of the i-th sub-block. In an embodiment, when the coordinates of the first reference block are valid, a corresponding content is acquired according to the coordinates of the first reference block, and the corresponding content is compared with the content of the i-th sub-block to determine whether the contents of the two blocks are consistent. In some embodiments, whether the contents of the two blocks are consistent may be determined by detecting whether the residual contents are all 0.

In some embodiments, when the residual contents are all 0, it indicates that the content of the i-th sub-block is consistent with the content of the first reference block, step S6 is performed, IBC mode coding is performed on the i-th sub-block, and the corresponding BV is calculated.

In some embodiments, the method further includes the following operation.

In response to the coordinates of the first reference block being invalid, coding is performed on the i-th sub-block by using the preset coding method.

In an embodiment, when the coordinates of the first reference block are invalid, it indicates that IBC mode coding may be not performed on the current i-th sub-block, and coding is performed on the i-th sub-block in other modes.

In some embodiments, the method further includes the following operation.

The coordinates corresponding to the first reference block in the first hash table are replaced with the coordinates corresponding to the i-th sub-block.

In an embodiment, when the hash value and the content of the i-th sub-block are the same as those of the first reference block, because the latest and nearest coordinates are recorded in the first hash table, replace the coordinates of the first reference block in the first hash table with the coordinates of the i-th sub-block. That is, when the search is performed in the first hash table by using the hash value of the i-th sub-block or the first reference block, the coordinates of the i-th sub-block are obtained.

In some embodiments, the method further includes the following operations.

A coordinate difference between the coordinates of the first reference block and the coordinates of the i-th sub-block is calculated.

The second hash table is updated to add the coordinate difference and the coordinates of the i-th sub-block.

In an embodiment, after the coordinates corresponding to the first reference block in the first hash table are replaced with the coordinates corresponding to the i-th sub-block, the coordinates of the first reference block may be recorded in the second hash table in the form of the difference.

In some embodiments, the second hash table may be a Chained Hash Table (CHT), the CHT is a two-dimensional array. The array coordinates are the coordinates of a sub-block image, and the array elements are coordinate differences (dx dy). The second hash table is used in conjunction with the first hash table to construct the CHT. The significance of the CHT is to construct a relationship between the sub-blocks with the same hash value, that is, $Hash_{CHT[x][y]} = Hash_{CHT[x-dx][y-dy]}$. For example, when the hash value of the i-th sub-block is the same as the hash value of the first reference block, the coordinates of the i-th sub-block are used as the index of the second hash table, and the coordinate difference between the coordinates of the i-th sub-block and the coordinates of the first reference block is used as the values. In this way, the coordinate difference between the i-th sub-block and the first reference block may be obtained by using the coordinates of the i-th sub-block, and the coordinates of the first reference block are obtained.

In some embodiments, the method further includes the following operations.

In response to the content of the first reference block being inconsistent with the content of the i-th sub-block, a search is performed in a second hash table according to the coordinates of the first reference block, so as to obtain a difference between the coordinates of a second reference block and the coordinates of the first reference block, wherein a hash value corresponding to the second reference block is the same as the hash value corresponding to the first reference block.

The coordinates of the second reference block are determined according to the coordinates of the first reference block and the difference between the coordinates of the second reference block and the coordinates of the first reference block.

A content of the second reference block is acquired according to the coordinates of the second reference block, and the content of the second reference block is compared with the content of the i-th sub-block.

In response to the content of the second reference block being consistent with the content of the i-th sub-block, IBC coding is performed on the i-th sub-block.

In an embodiment, when the content of the i-th sub-block is inconsistent with the content of the first reference block, it indicates that a hash conflict (the hash values are the same, but the original content is different) exists, at this time, perform the search in the second hash table according to the coordinates of the first reference block, so as to obtain the coordinates of the second reference block which has the same hash value as the coordinates of the first reference block. Because the coordinate difference is recorded in the second hash table, the coordinate difference between the first reference block and the second reference block may be obtained according to the coordinates of the first reference block, and the coordinates of the second reference block are obtained according to the coordinate difference. It is determined whether the second reference block may be used as the reference of the i-th sub-block. Similarly, it is determined whether the content of the second reference block is the same as the content of the i-th sub-block. When the content of the second reference block is the same as the content of the i-th sub-block, it indicates that the second reference block may be used as the reference of the i-th sub-block, IBC mode coding is performed on the i-th sub-block according to the second reference block, and the corresponding BV is calculated. When the content of the second reference block is different from the content of the i-th sub-block, based on the same process, a third reference block may continue to be searched in the second hash table according to the coordinates of the second reference block and content determination is performed. When the coordinates of the reference block with the same content are not searched in the second hash table, coding is performed on the i-th sub-block in other modes.

In some embodiments, in step S3, the operation that the search is performed in the first hash table by using the hash value corresponding to the i-th sub-block, so as to obtain coordinates corresponding to the first reference block, wherein a hash value corresponding to the first reference block is the same as the hash value corresponding to the i-th sub-block further includes the following operations.

In response to the coordinates of the first reference block not existing in the first hash table, wherein the hash value corresponding to the first reference block is the same as the hash value corresponding to the i-th sub-block, the first hash table is updated to add the hash value corresponding to the i-th sub-block and the corresponding coordinates.

Coding is performed on the i-th sub-block by using a preset coding method.

In an embodiment, when the coordinates of the first reference block do not exist in the first hash table, wherein the hash value corresponding to the first reference block is the same as the hash value corresponding to the i-th sub-block, the first hash table is updated to add the hash value corresponding to the i-th sub-block and the corresponding coordinates, so that when the hash value of other sub-blocks is the same as the hash value of the i-th sub-block, the coordinates corresponding to the i-th sub-block may be searched in the first hash table by using the same hash value. At the same time, it also indicates that IBC mode coding may not be performed on the current i-th sub-block, and coding is performed on the i-th sub-block in other modes.

In some embodiments, the method further includes the following operation.

A third hash table is updated to add the coordinates and the hash value of the i-th sub-block.

In an embodiment, the third hash table (Block_hash_table) is a Block Hash Table (BHT), the BHT belongs to a block hash list and is also a two-dimensional array, but the array coordinates are the coordinates of the sub-block image, and the array elements are the hash value of the content of the sub-block image corresponding to the coordinates. The hash value corresponding to each coordinate may be recorded through the third hash table.

Figure 2:
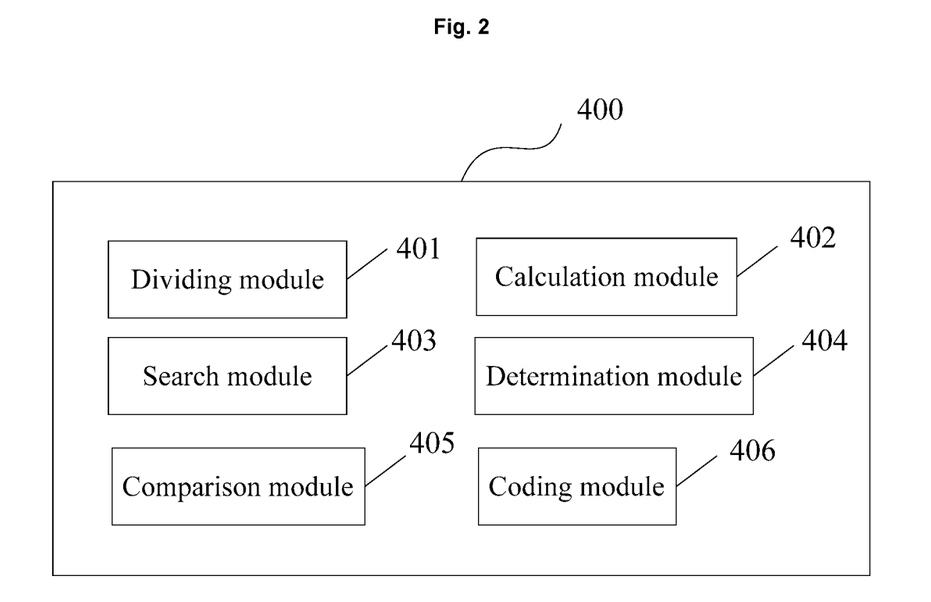
FIG. 2 is a schematic structural diagram of a video image coding system provided according to an embodiment of the present disclosure.

Based on the same concept of the present disclosure, according to another aspect of the present disclosure, the embodiments of the present disclosure further provide a video image coding system 400, as shown in FIG. 2, the system 400 includes a dividing module 401, a calculation module 402, a search module 403, a determination module 404, a comparison module 405 and a coding module 406.

The dividing module 401 is configured to divide an image frame to be coded into a plurality of sub-blocks, and assign coordinates to each sub-block.

The calculation module 402 is configured to calculate a hash value corresponding to an i-th sub-block according to a content of the i-th sub-block.

The search module 403 is configured to perform a search in a first hash table by using the hash value corresponding to the i-th sub-block, so as to obtain coordinates corresponding to a first reference block, wherein a hash value corresponding to the first reference block is the same as the hash value corresponding to the i-th sub-block.

The determination module 404 is configured to determine whether the coordinates of the first reference block are valid according to coordinates of the i-th sub-block.

The comparison module 405 is configured to acquire a content of the first reference block according to the coordinates of the first reference block, and compare the content of the first reference block with the content of the i-th sub-block in response to the coordinates of the first reference block being valid.

The coding module 406 is configured to perform IBC coding on the i-th sub-block in response to the content of the first reference block being consistent with the content of the i-th sub-block.

In some embodiments, the operation that the search is performed in the first hash table by using the hash value corresponding to the i-th sub-block, so as to obtain coordinates corresponding to the first reference block, wherein a hash value corresponding to the first reference block is the same as the hash value corresponding to the i-th sub-block further includes the following operations.

In response to the coordinates of the first reference block not existing in the first hash table, wherein the hash value corresponding to the first reference block is the same as the hash value corresponding to the i-th sub-block, the first hash table is updated to add the hash value corresponding to the i-th sub-block and the corresponding coordinates.

Coding is performed on the i-th sub-block by using a preset coding method.

In some embodiments, the system 400 further includes the following operation.

In response to the coordinates of the first reference block being invalid, coding is performed on the i-th sub-block by using the preset coding method.

In some embodiments, the system 400 further includes the following operations.

In response to the content of the first reference block being inconsistent with the content of the i-th sub-block, a search is performed in a second hash table according to the coordinates of the first reference block, so as to obtain a difference between the coordinates of a second reference block and the coordinates of the first reference block, wherein a hash value corresponding to the second reference block is the same as the hash value corresponding to the first reference block.

The coordinates of the second reference block are determined according to the coordinates of the first reference block and the difference between the coordinates of the second reference block and the coordinates of the first reference block.

A content of the second reference block is acquired according to the coordinates of the second reference block, and the content of the second reference block is compared with the content of the i-th sub-block.

In response to the content of the second reference block being consistent with the content of the i-th sub-block, IBC coding is performed on the i-th sub-block.

In some embodiments, the system 400 further includes the following operation.

The coordinates corresponding to the first reference block in the first hash table are replaced with the coordinates corresponding to the i-th sub-block.

In some embodiments, the system 400 further includes the following operations.

A coordinate difference between the coordinates of the first reference block and the coordinates of the i-th sub-block is calculated.

The second hash table is updated to add the coordinate difference and the coordinates of the i-th sub-block.

In some embodiments, the system 400 further includes the following operation.

A third hash table is updated to add the coordinates and the hash value of the i-th sub-block.

Figure 3:
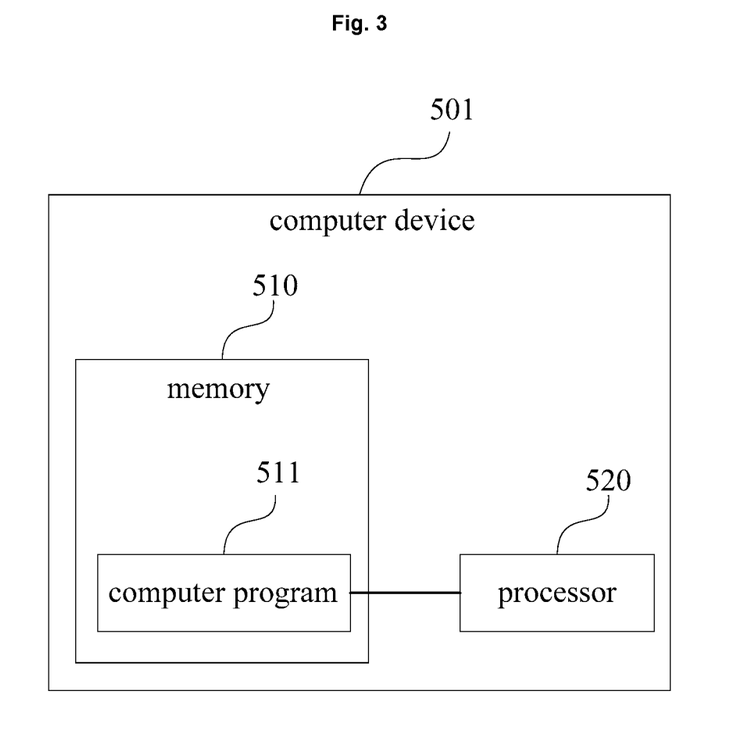
FIG. 3 is a schematic structural diagram of a computer device provided according to an embodiment of the present disclosure.

Based on the same concept of the present disclosure, according to another aspect of the present disclosure, as shown in FIG. 3, the embodiments of the present disclosure further provide a computer device 501, the computer device 501 includes at least one processor 520 and a memory 510.

The memory 510 is configured to store a computer program 511, the computer program 511 can be run on the processor 520. When the computer program 511 is executed by the processor 520, the processor 520 performs the following steps.

At step S1, an image frame to be coded is divided into a plurality of sub-blocks, and coordinates are assigned to each sub-block.

At step S2, a hash value corresponding to an i-th sub-block is calculated according to a content of the i-th sub-block.

At step S3, a search is performed in a first hash table by using the hash value corresponding to the i-th sub-block, so as to obtain coordinates corresponding to a first reference block, wherein a hash value corresponding to the first reference block is the same as the hash value corresponding to the i-th sub-block.

At step S4, according to the coordinates of the i-th sub-block, it is determined whether the coordinates of the first reference block are valid.

At step S5, in response to the coordinates of the first reference block being valid, a content of the first reference block is acquired according to the coordinates of the first reference block, and the content of the first reference block is compared with the content of the i-th sub-block.

At step S6, in response to the content of the first reference block being consistent with the content of the i-th sub-block, IBC coding is performed on the i-th sub-block.

In some embodiments, the operation that the search is performed in the first hash table by using the hash value corresponding to the i-th sub-block, so as to obtain coordinates corresponding to the first reference block, wherein a hash value corresponding to the first reference block is the same as the hash value corresponding to the i-th sub-block further includes the following operations.

In response to the coordinates of the first reference block not existing in the first hash table, wherein the hash value corresponding to the first reference block is the same as the hash value corresponding to the i-th sub-block, the first hash table is updated to add the hash value corresponding to the i-th sub-block and the corresponding coordinates.

Coding is performed on the i-th sub-block by using a preset coding method.

In some embodiments, the processor 520 further includes the following operation.

In response to the coordinates of the first reference block being invalid, coding is performed on the i-th sub-block by using the preset coding method.

In some embodiments, the processor 520 further includes the following operations.

In response to the content of the first reference block being inconsistent with the content of the i-th sub-block, a search is performed in a second hash table according to the coordinates of the first reference block, so as to obtain a difference between the coordinates of a second reference block and the coordinates of the first reference block, wherein a hash value corresponding to the second reference block is the same as the hash value corresponding to the first reference block.

The coordinates of the second reference block are determined according to the coordinates of the first reference block and the difference between the coordinates of the second reference block and the coordinates of the first reference block.

A content of the second reference block is acquired according to the coordinates of the second reference block, and the content of the second reference block is compared with the content of the i-th sub-block.

In response to the content of the second reference block being consistent with the content of the i-th sub-block, IBC coding is performed on the i-th sub-block.

In some embodiments, the processor 520 further includes the following operation.

The coordinates corresponding to the first reference block in the first hash table are replaced with the coordinates corresponding to the i-th sub-block.

In some embodiments, the processor 520 further includes the following operations.

A coordinate difference between the coordinates of the first reference block and the coordinates of the i-th sub-block is calculated.

The second hash table is updated to add the coordinate difference and the coordinates of the i-th sub-block.

In some embodiments, the processor 520 further includes the following operation.

A third hash table is updated to add the coordinates and the hash value of the i-th sub-block.

Figure 4:
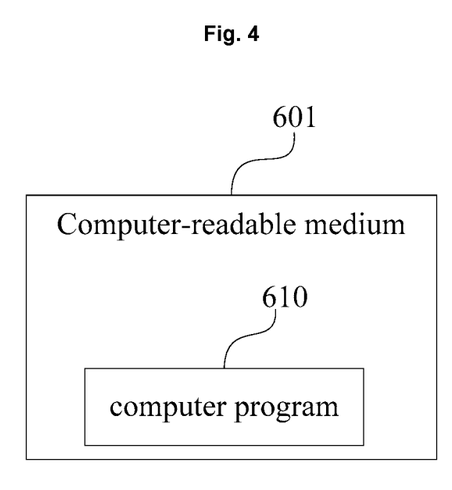
FIG. 4 is a schematic structural diagram of a computer-readable storage medium provided according to an embodiment of the present disclosure.

Based on the same concept of the present disclosure, according to another aspect of the present disclosure, as shown in FIG. 4, the embodiments of the present disclosure further provide a computer-readable storage medium 601. The computer-readable storage medium 601 is configured to store a computer program 610. When the computer program 610 is executed by a processor, the processor performs the following steps.

At step S1, an image frame to be coded is divided into a plurality of sub-blocks, and coordinates are assigned to each sub-block.

At step S2, a hash value corresponding to an i-th sub-block is calculated according to a content of the i-th sub-block.

At step S3, a search is performed in a first hash table by using the hash value corresponding to the i-th sub-block, so as to obtain coordinates corresponding to a first reference block, wherein a hash value corresponding to the first reference block is the same as the hash value corresponding to the i-th sub-block.

At step S4, according to the coordinates of the i-th sub-block, it is determined whether the coordinates of the first reference block are valid.

At step S5, in response to the coordinates of the first reference block being valid, a content of the first reference block is acquired according to the coordinates of the first reference block, and the content of the first reference block is compared with the content of the i-th sub-block.

At step S6, in response to the content of the first reference block being consistent with the content of the i-th sub-block, IBC coding is performed on the i-th sub-block.

In some embodiments, the operation that the search is performed in the first hash table by using the hash value corresponding to the i-th sub-block, so as to obtain coordinates corresponding to the first reference block, wherein a hash value corresponding to the first reference block is the same as the hash value corresponding to the i-th sub-block further includes the following operations.

In response to the coordinates of the first reference block not existing in the first hash table, wherein the hash value corresponding to the first reference block is the same as the hash value corresponding to the i-th sub-block, the first hash table is updated to add the hash value corresponding to the i-th sub-block and the corresponding coordinates.

Coding is performed on the i-th sub-block by using a preset coding method.

In some embodiments, the processor further includes the following operation.

In response to the coordinates of the first reference block being invalid, coding is performed on the i-th sub-block by using the preset coding method.

In some embodiments, the processor further includes the following operations.

In response to the content of the first reference block being inconsistent with the content of the i-th sub-block, a search is performed in a second hash table according to the coordinates of the first reference block, so as to obtain a difference between the coordinates of a second reference block and the coordinates of the first reference block, wherein a hash value corresponding to the second reference block is the same as the hash value corresponding to the first reference block.

The coordinates of the second reference block are determined according to the coordinates of the first reference block and the difference between the coordinates of the second reference block and the coordinates of the first reference block.

A content of the second reference block is acquired according to the coordinates of the second reference block, and the content of the second reference block is compared with the content of the i-th sub-block.

In response to the content of the second reference block being consistent with the content of the i-th sub-block, IBC coding is performed on the i-th sub-block.

In some embodiments, the processor further includes the following operation.

The coordinates corresponding to the first reference block in the first hash table are replaced with the coordinates corresponding to the i-th sub-block.

In some embodiments, the processor further includes the following operations.

A coordinate difference between the coordinates of the first reference block and the coordinates of the i-th sub-block is calculated.

The second hash table is updated to add the coordinate difference and the coordinates of the i-th sub-block.

In some embodiments, the processor further includes the following operation.

A third hash table is updated to add the coordinates and the hash value of the i-th sub-block.

It is to be noted that those of ordinary skill in the art may understand that implementation of all or part of the processes in the above embodiment method may be completed by instructing related hardware through a computer program, and the program may be stored in a computer-readable storage medium. The program, when executed, may include the processes of the embodiments of the above methods.

In addition, it should be appreciated that the computer-readable storage medium (such as the memory) herein may be a volatile memory or a nonvolatile memory, or may include both the volatile memory and the nonvolatile memory.

It is also to be appreciated by those skilled in the art that the various illustrative logical blocks, modules, circuits, and algorithm steps described in conjunction with the present disclosure herein may be implemented as electronic hardware, computer software, or a combination of the two. In order to clearly illustrate the interchangeability of the hardware and software, various illustrative components, blocks, modules, circuits, and steps have been described generally in terms of their functionality. Whether the functionality is implemented as the software or as the hardware depends upon a particular application and design constraints imposed on the overall system. Those skilled in the art may implement the functions in various ways for each specific application, but such implementation decision should not be interpreted as causing a departure from the scope disclosed in the embodiments of the present disclosure.

The above are the exemplary embodiments disclosed in the present disclosure, but it is to be noted that multiple changes and modifications can be made without departing from the scope of the embodiments disclosed in the present disclosure defined by the claims. The functions, steps and/or actions of the method claims according to the disclosed embodiments described herein need not be executed in any particular order. In addition, although the elements disclosed in the embodiments of the present disclosure can be described or claimed in individual form, they can also be understood as multiple unless explicitly limited to singular.

It should be understood that, as used herein, the singular form "a" and "one" is intended to also include the plural form unless the context clearly supports exceptions. It should also be understood that "and/or" as used herein means any and all possible combinations including at least one items listed in association.

The sequence numbers of the embodiments of the present disclosure are adopted not to represent superiority-inferiority of the embodiments but only for description.

Those of ordinary skill in the art should know that all or part of the steps of the above-mentioned embodiments may be implemented by hardware or related hardware instructed through a program, the program may be stored in the computer-readable medium, and the above-mentioned storage medium may be a read-only memory, a magnetic disk or a compact disc.

Those of ordinary skill in the art should understand that the discussion of any of the above embodiments is only exemplary, and is not intended to imply that the scope (including the claims) disclosed by the embodiments of the present disclosure is limited to these examples. Under the idea of the embodiments of the present disclosure, technical features in the above embodiments or different embodiments may also be combined, and there are many other variations of different aspects of the above embodiments of the present disclosure, which are not provided in details for brevity. Therefore, any omission, modification, equivalent substitution, improvement, etc. made within the spirit and principle of the embodiments of the present disclosure should be included in the scope of protection of the embodiments of the present disclosure.

What is claimed is:

1. A video image coding method, comprising:
dividing an image frame to be coded into a plurality of sub-blocks, and assigning coordinates to each sub-block;
calculating a hash value corresponding to an i-th sub-block according to a content of the i-th sub-block;
performing a search in a first hash table by using the hash value corresponding to the i-th sub-block, so as to obtain coordinates corresponding to a first reference block, wherein a hash value corresponding to the first reference block is the same as the hash value corresponding to the i-th sub-block;
determining whether the coordinates of the first reference block are valid according to coordinates of the i-th sub-block;
in response to the coordinates of the first reference block being valid, acquiring a content of the first reference block according to the coordinates of the first reference block, and comparing the content of the first reference block with the content of the i-th sub-block;
in response to the content of the first reference block being consistent with the content of the i-th sub-block, performing Intra Block Copy (IBC) coding on the i-th sub-block;
replacing the coordinates corresponding to the first reference block in the first hash table with the coordinates corresponding to the i-th sub-block;
calculating a coordinate difference between the coordinates of the first reference block and the coordinates of the i-th sub-block; and
updating the second hash table to add the coordinate difference and the coordinates of the i-th sub-block;
wherein the i-th sub-block is any one of the plurality of sub-blocks;
wherein determining whether the coordinates of the first reference block are valid according to coordinates of the i-th sub-block further comprises:
determining whether a coordinate difference is within a preset range, wherein the coordinate difference is the difference between the horizontal and vertical coordinates of the first reference block and the horizontal and vertical coordinates of the i-th sub-block; and
when the coordinate difference is within the preset range, determining that the first reference block is valid.

2. The method as claimed in claim 1, wherein the performing a search in a first hash table by using the hash value corresponding to the i-th sub-block, so as to obtain coordinates corresponding to a first reference block, wherein a hash value corresponding to the first reference block is the same as the hash value corresponding to the i-th sub-block further comprises:
in response to the coordinates of the first reference block not existing in the first hash table, wherein the hash value corresponding to the first reference block is the same as the hash value corresponding to the i-th sub-block, updating the first hash table to add the hash value corresponding to the i-th sub-block and the corresponding coordinates; and
performing coding on the i-th sub-block by using a preset coding method.

3. The method as claimed in claim 1, further comprising:
in response to the coordinates of the first reference block being invalid, performing coding on the i-th sub-block by using a preset coding method.

4. The method as claimed in claim 1, further comprising:
in response to the content of the first reference block being inconsistent with the content of the i-th sub-block, performing a search in a second hash table according to the coordinates of the first reference block, so as to obtain a difference between the coordinates of a second reference block and the coordinates of the first reference block, wherein a hash value corresponding to the second reference block is the same as the hash value corresponding to the first reference block;
determining the coordinates of the second reference block according to the coordinates of the first reference block and the difference between the coordinates of the second reference block and the coordinates of the first reference block;
acquiring a content of the second reference block according to the coordinates of the second reference block, and comparing the content of the second reference block with the content of the i-th sub-block; and
in response to the content of the second reference block being consistent with the content of the i-th sub-block, performing IBC coding on the i-th sub-block.

5. The method as claimed in claim 1, further comprising:
updating a third hash table to add the coordinates and the hash value of the i-th sub-block.

6. A computer device, comprising:
at least one processor; and
a memory, the memory is configured to store a computer program, the computer program can be run on the processor, wherein when the computer program is executed by the processor, cause the processor to:
divide an image frame to be coded into a plurality of sub-blocks, and assign coordinates to each sub-block;
calculate a hash value corresponding to an i-th sub-block according to a content of the i-th sub-block;
perform a search in a first hash table by using the hash value corresponding to the i-th sub-block, so as to obtain coordinates corresponding to a first reference block, wherein a hash value corresponding to the first reference block is the same as the hash value corresponding to the i-th sub-block;
determine whether the coordinates of the first reference block are valid according to coordinates of the i-th sub-block;
acquire a content of the first reference block according to the coordinates of the first reference block, and compare the content of the first reference block with the content of the i-th sub-block in response to the coordinates of the first reference block being valid;
perform IBC coding on the i-th sub-block in response to the content of the first reference block being consistent with the content of the i-th sub-block;
replace the coordinates corresponding to the first reference block in the first hash table with the coordinates corresponding to the i-th sub-block;
calculate a coordinate difference between the coordinates of the first reference block and the coordinates of the i-th sub-block; and
update the second hash table to add the coordinate difference and the coordinates of the i-th sub-block;
wherein the i-th sub-block is any one of the plurality of sub-blocks;
wherein determine whether the coordinates of the first reference block are valid according to coordinates of the i-th sub-block further comprises:
determine whether a coordinate difference is within a preset range, wherein the coordinate difference is the difference between the horizontal and vertical coordinates of the first reference block and the horizontal and vertical coordinates of the i-th sub-block; and when the coordinate difference is within the preset range, determine that the first reference block is valid.

7. A non-volatile computer-readable storage medium, the non-volatile computer-readable storage medium is configured to store a computer program, wherein when the computer program is executed by a processor, cause the processor to:

divide an image frame to be coded into a plurality of sub-blocks, and assign coordinates to each sub-block;

calculate a hash value corresponding to an i-th sub-block according to a content of the i-th sub-block;

perform a search in a first hash table by using the hash value corresponding to the i-th sub-block, so as to obtain coordinates corresponding to a first reference block, wherein a hash value corresponding to the first reference block is the same as the hash value corresponding to the i-th sub-block;

determine whether the coordinates of the first reference block are valid according to coordinates of the i-th sub-block;

acquire a content of the first reference block according to the coordinates of the first reference block, and compare the content of the first reference block with the content of the i-th sub-block in response to the coordinates of the first reference block being valid;

perform IBC coding on the i-th sub-block in response to the content of the first reference block being consistent with the content of the i-th sub-block;

replace the coordinates corresponding to the first reference block in the first hash table with the coordinates corresponding to the i-th sub-block;

calculate a coordinate difference between the coordinates of the first reference block and the coordinates of the i-th sub-block; and update the second hash table to add the coordinate difference and the coordinates of the i-th sub-block;

wherein the i-th sub-block is any one of the plurality of sub-blocks;

wherein determine whether the coordinates of the first reference block are valid according to coordinates of the i-th sub-block further comprises:

determine whether a coordinate difference is within a preset range, wherein the coordinate difference is the difference between the horizontal and vertical coordinates of the first reference block and the horizontal and vertical coordinates of the i-th sub-block; and when the coordinate difference is within the preset range, determine that the first reference block is valid.

8. The method as claimed in claim 1, further comprising: when the coordinate difference is not within the preset range, determining that the first reference block is invalid.

9. The method as claimed in claim 1, wherein the comparing the content of the first reference block with the content of the i-th sub-block further comprises:

determining whether the content of the first reference block and the content of the i-th sub-block are consistent by detecting whether the residual contents are all 0.

10. The method as claimed in claim 9, wherein the determining whether the content of the first reference block and the content of the i-th sub-block are consistent by detecting whether the residual contents are all 0 further comprises:

when the residual contents are all 0, determining that the content of the i-th sub-block is consistent with the content of the first reference block.

11. The method as claimed in claim 4, further comprising:

in response to the content of the second reference block being inconsistent with the content of the i-th sub-block, performing a search in the second hash table according to the coordinates of the second reference block, so as to obtain a third reference block.

12. The non-volatile computer-readable storage medium as claimed in claim 7, wherein when the computer program is executed by a processor, cause the processor to:

in response to the coordinates of the first reference block not existing in the first hash table, wherein the hash value corresponding to the first reference block is the same as the hash value corresponding to the i-th sub-block, update the first hash table to add the hash value corresponding to the i-th sub-block and the corresponding coordinates; and perform coding on the i-th sub-block by using a preset coding method.

13. The non-volatile computer-readable storage medium as claimed in claim 7, wherein when the computer program is executed by a processor, cause the processor to:

in response to the coordinates of the first reference block being invalid, perform coding on the i-th sub-block by using a preset coding method.

14. The non-volatile computer-readable storage medium as claimed in claim 7, wherein when the computer program is executed by a processor, cause the processor to:

in response to the content of the first reference block being inconsistent with the content of the i-th sub-block, perform a search in a second hash table according to the coordinates of the first reference block, so as to obtain a difference between the coordinates of a second reference block and the coordinates of the first reference block, wherein a hash value corresponding to the second reference block is the same as the hash value corresponding to the first reference block;

determine the coordinates of the second reference block according to the coordinates of the first reference block and the difference between the coordinates of the second reference block and the coordinates of the first reference block;

acquire a content of the second reference block according to the coordinates of the second reference block, and compare the content of the second reference block with the content of the i-th sub-block; and in response to the content of the second reference block being consistent with the content of the i-th sub-block, perform IBC coding on the i-th sub-block.

15. The non-volatile computer-readable storage medium as claimed in claim 7, wherein when the computer program is executed by a processor, cause the processor to:

replace the coordinates corresponding to the first reference block in the first hash table with the coordinates corresponding to the i-th sub-block.

16. The non-volatile computer-readable storage medium as claimed in claim 15, wherein when the computer program is executed by a processor, cause the processor to:

calculate a coordinate difference between the coordinates of the first reference block and the coordinates of the i-th sub-block; and update the second hash table to add the coordinate difference and the coordinates of the i-th sub-block.

17. The non-volatile computer-readable storage medium as claimed in claim 7, wherein when the computer program is executed by a processor, cause the processor to:
update a third hash table to add the coordinates and the hash value of the i-th sub-block.

18. The non-volatile computer-readable storage medium as claimed in claim 7, wherein when the computer program is executed by a processor, cause the processor to:
determine whether a coordinate difference is within a preset range, wherein the coordinate difference is the difference between the horizontal and vertical coordinates of the first reference block and the horizontal and vertical coordinates of the i-th sub-block and
determine the first reference block is valid when the coordinate difference is within the preset range.

19. The non-volatile computer-readable storage medium as claimed in claim 18, wherein when the computer program is executed by a processor, cause the processor to:
determine the first reference block is invalid when the coordinate difference is not within the preset range.

* * * * *